United States Patent
Youn et al.

(10) Patent No.: US 9,288,400 B2
(45) Date of Patent: Mar. 15, 2016

(54) METHOD OF CONTROLLING EXPOSURE TIME BY USING INFRARED LIGHT, COMPUTER-READABLE STORAGE MEDIUM HAVING RECORDED THEREON COMPUTER PROGRAM CODES FOR PERFORMING THE METHOD, AND ELECTRONIC APPARATUS HAVING PHOTOGRAPHING FUNCTION

(71) Applicant: SAMSUNG ELECTRONICS CO., LTD., Suwon-si, Gyeonggi-do (KR)

(72) Inventors: Yeo-tak Youn, Suwon-si (KR); Atsushi Mikoshiba, Seongnam-si (KR); Hiroshi Dohi, Seongnam-si (KR); Ji-woong Park, Suwon-si (KR); Takafumi Usui, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/494,816

(22) Filed: Sep. 24, 2014

(65) Prior Publication Data
US 2015/0097964 A1    Apr. 9, 2015

(30) Foreign Application Priority Data
Oct. 8, 2013  (KR) .................. 10-2013-0120186

(51) Int. Cl.
*G03B 15/03*   (2006.01)
*H04N 5/235*   (2006.01)
*H04N 5/33*    (2006.01)
*G03B 7/08*    (2014.01)

(52) U.S. Cl.
CPC ............... *H04N 5/2353* (2013.01); *G03B 7/08* (2013.01); *H04N 5/33* (2013.01)

(58) Field of Classification Search
USPC ................ 396/80, 155, 159, 164–166
See application file for complete search history.

(56) References Cited

U.S. PATENT DOCUMENTS

| 7,679,672 | B2  |   | 3/2010 | Chua et al. |
| 7,801,438 | B2  | * | 9/2010 | Khuntia ................. 396/174 |
| 2011/0043460 | A1 | * | 2/2011 | Kim et al. ............... 345/173 |
| 2013/0182164 | A1 | * | 7/2013 | Duggal et al. ........... 348/302 |

FOREIGN PATENT DOCUMENTS

JP    2010-020332 A    1/2010

* cited by examiner

*Primary Examiner* — Minh Phan
(74) *Attorney, Agent, or Firm* — Drinker Biddle & Reath LLP

(57) ABSTRACT

An electronic apparatus having a photographing function includes: a flash that emits light including a visible light wavelength range and an infrared wavelength range and radiates the light onto a subject; an infrared detector that absorbs light in the infrared wavelength range and generates a detection signal corresponding to the light; an image sensor that photoelectrically transforms incident light and generates an image signal; and a controller that controls an exposure time of the image sensor based on the detection signal.

17 Claims, 4 Drawing Sheets

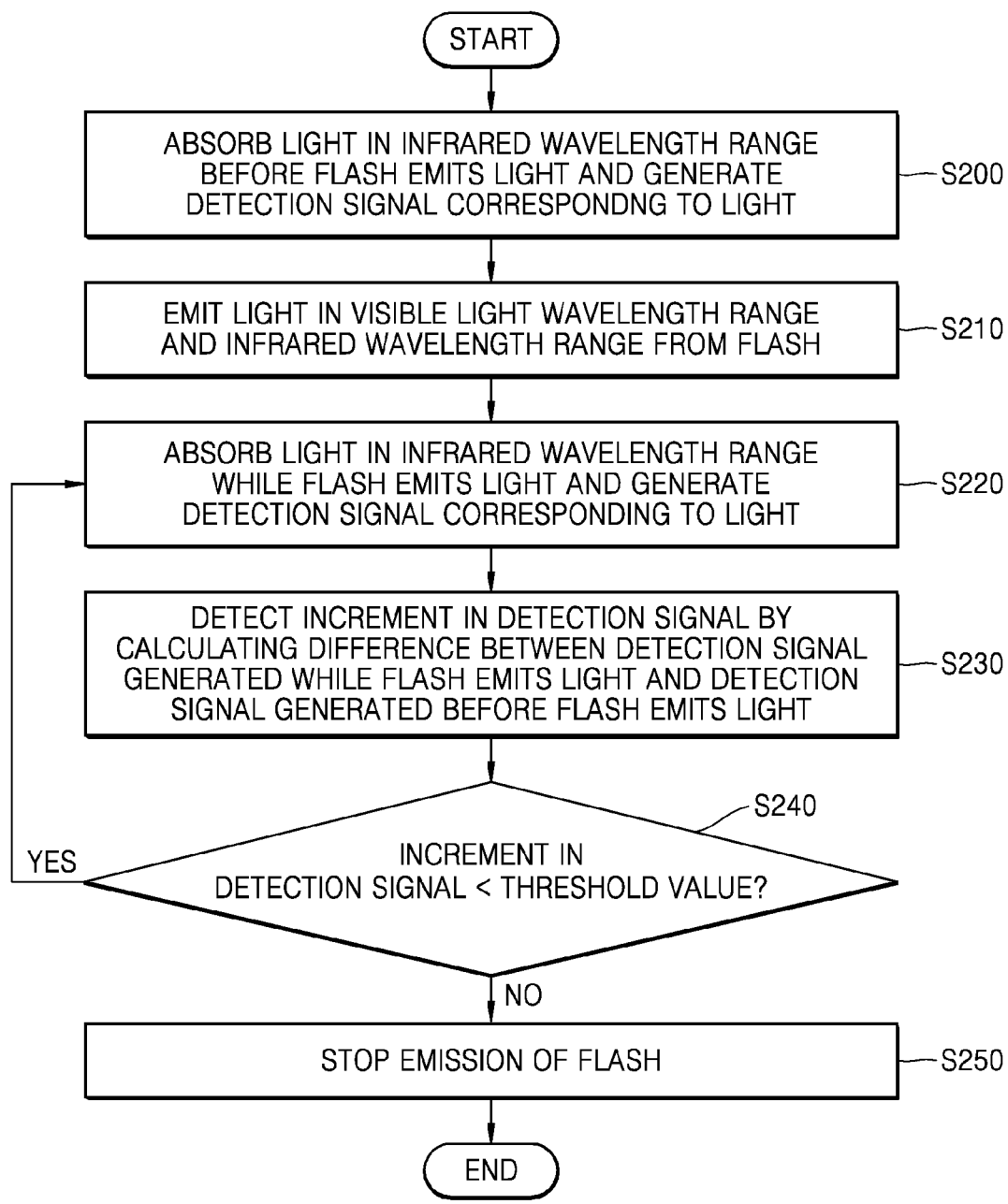

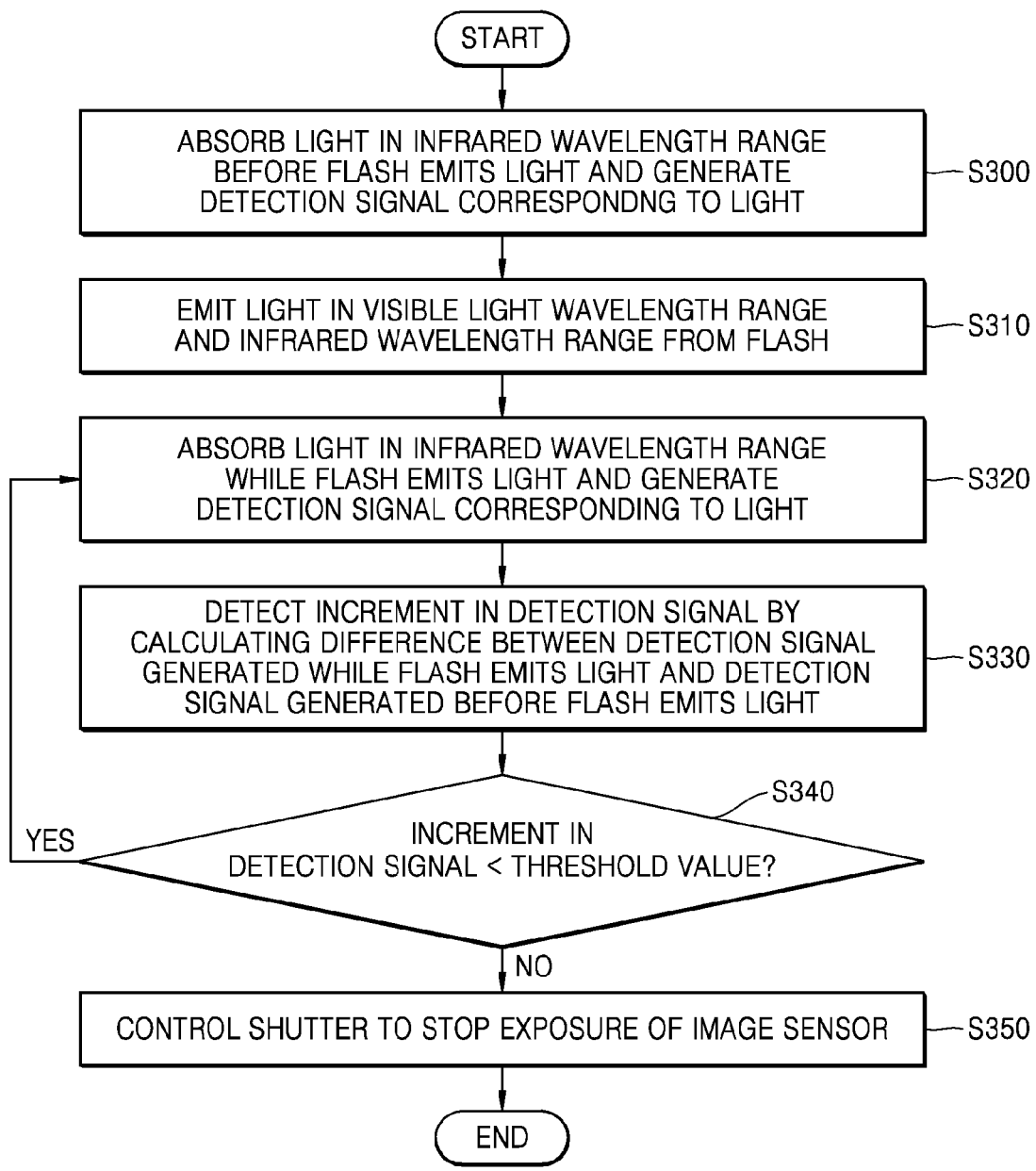

METHOD OF CONTROLLING EXPOSURE TIME BY USING INFRARED LIGHT, COMPUTER-READABLE STORAGE MEDIUM HAVING RECORDED THEREON COMPUTER PROGRAM CODES FOR PERFORMING THE METHOD, AND ELECTRONIC APPARATUS HAVING PHOTOGRAPHING FUNCTION

RELATED APPLICATION

This application claims the priority benefit of Korean Patent Application No. 10-2013-0120186, filed on Oct. 8, 2013, in the Korean Intellectual Property Office, the disclosure of which is incorporated herein in its entirety by reference.

BACKGROUND

1. Field

One or more embodiments relate to a method of controlling an exposure time by using infrared light, a computer-readable storage medium having recorded thereon computer program codes for performing the method, and an electronic apparatus having a photographing function.

2. Description of the Related Art

When night photographing is performed, a flash is turned on so as to supply a required amount of light. The flash is largely classified into a manual method, an auto method, and a through the lens (TTL) method according to a manipulation method.

Since the flash bursts very bright light instantaneously, a time when the flash is turned on is a significant factor for satisfying an appropriate amount of light. In order to calculate a flash operating time of a camera, the flash performs pre-emission before performing main emission, and the camera previously calculates a time required for main emission based on an increment in brightness and captures an image of a subject together with main emission.

However, in pre-emission, a time of about 200 to 300 ms is required to calculate a time required for main emission before main emission is performed. Thus, it is difficult to capture an image of a desired scene by capturing an image of the subject that moves quickly.

For example, when an image of an animal that is sensitive to light is captured, the animal moves while seeing bright light of pre-emission. Thus, when main emission is performed, an image of a different scene from a desired scene obtained when a user presses a shutter may be captured.

That is, when the subject moves at a temporal distance between pre-emission and main emission, photometry information varies and an appropriate amount of light varies. Thus, an image that is different from a user's intention can be obtained.

SUMMARY

Additional aspects will be set forth in part in the description which follows and, in part, will be apparent from the description, or may be learned by practice of the presented embodiments.

According to one or more embodiments, an electronic apparatus having a photographing function includes: a flash that emits light including a visible light wavelength range and an infrared wavelength range and radiates the light onto a subject; an infrared detector that absorbs light in the infrared wavelength range and generates a detection signal corresponding to the light; an image sensor that photoelectrically transforms incident light and generates an image signal; and a controller that controls an exposure time of the image sensor based on the detection signal.

The infrared detector may be mounted on a front side of the image sensor.

The infrared detector may include an organic layer that absorbs light in the infrared wavelength range.

The controller may control an exposure time of the image sensor when main emission of the flash is performed.

When an increment in the detection signal generated by the infrared detector, compared to a case in which the emission of the flash is not performed, reaches a threshold value, the controller may stop exposure of the image sensor.

The increment in the detection signal may be a difference between a detection signal generated by the infrared detector before emission of the flash is performed and a detection signal generated by the infrared detector while the flash emits light.

The threshold value may be set based on an appropriate amount of visible light, a correlation coefficient between an amount of visible light and an amount of infrared light, and the relationship between the amount of infrared light and the detection signal.

When the increment in the detection signal generated by the infrared detector, compared to a case in which the emission of the flash is not performed, reaches the threshold value, the controller may stop emission of the flash.

The electronic apparatus may further include a shutter that controls exposure of the image sensor, wherein, when the increment in the detection signal generated by the infrared detector, compared to a case in which the emission of the flash is not performed, reaches the threshold value, the controller may control the shutter to stop exposure of the image sensor.

According to one or more embodiments, a method of controlling an exposure time by using infrared light, includes: emitting light including a visible light wavelength range and an infrared wavelength range from a flash; absorbing light in the infrared wavelength range and generating a detection signal corresponding to the light; and controlling an exposure time of an image sensor based on the detection signal.

When main emission of the flash is performed, an exposure time of the image sensor may be controlled.

If an increment in the detection signal, compared to a case in which the emission of the flash is not performed, reaches a threshold value, the exposure of the image sensor may be stopped.

The increment in the detection signal may be a difference between a detection signal generated before emission of the flash is performed and a detection signal generated while the flash emits light.

The threshold value may be set based on an appropriate amount of visible light, a correlation coefficient between an amount of visible light and an amount of infrared light, and the relationship between the amount of infrared light and the detection signal.

If the increment in the detection signal, compared to a case in which the emission of the flash is not performed, reaches a threshold value, the emission of the flash may be stopped.

If the increment in the detection signal, compared to a case in which the emission of the flash is not performed, reaches a threshold value, a shutter may be controlled to stop exposure of the image sensor.

According to one or more embodiments, a non-transitory computer-readable recording medium has recorded thereon computer program codes for performing a method of controlling an exposure time by using infrared light when the computer program codes are read and executed by a processor. The method of controlling an exposure time by using infrared light includes: emitting light including a visible light wavelength range and an infrared wavelength range from a flash; absorbing light in the infrared wavelength range and generating a detection signal corresponding to the light; and controlling an exposure time of an image sensor based on the detection signal.

When main emission of the flash is performed, an exposure time of the image sensor may be controlled.

When an increment in the detection signal, compared to a case in which the emission of the flash is not performed, reaches a threshold value, the emission of the flash may be stopped.

When the increment in the detection signal, compared to a case in which the emission of the flash is not performed, reaches a threshold value, a shutter may be controlled to stop exposure of the image sensor.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart of an operation of stopping emission of a flash when an increment in a generated detection signal reaches a threshold value, compared to a state in which the emission of the flash is not performed, according to an embodiment; and FIG. 4 is a flowchart of a method of controlling a shutter to stop exposure of an image sensor when the increment in the generated detection signal reaches the threshold value, compared to the state in which the emission of the flash is not performed, according to an embodiment.

DETAILED DESCRIPTION

Figure 1:
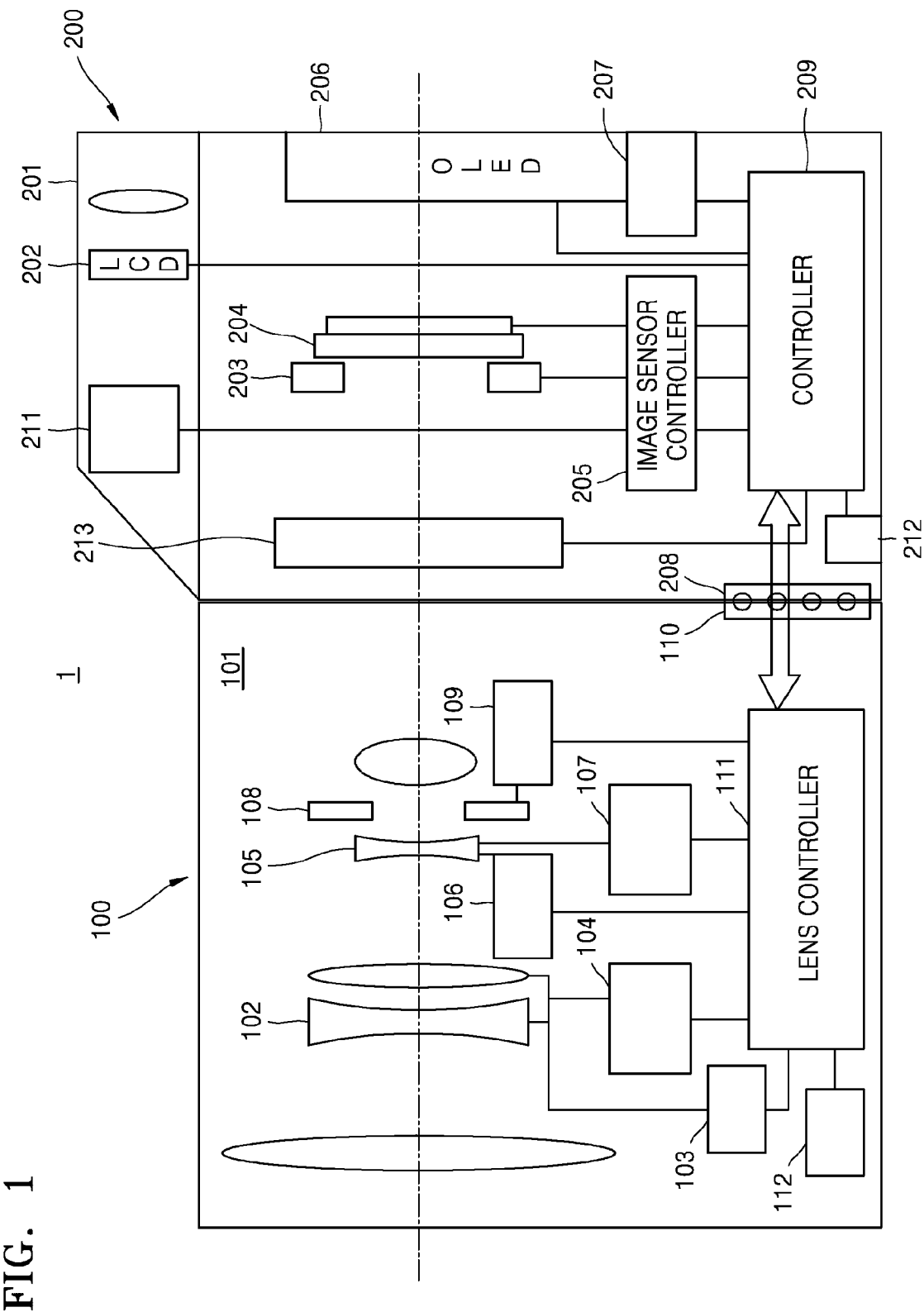
FIG. 1 is a block diagram of an electronic apparatus having a photographing function, according to an embodiment.

Reference will now be made in detail to embodiments, examples of which are illustrated in the accompanying drawings, wherein like reference numerals refer to like elements throughout. Although the following embodiments illustrate a digital camera that is an electronic apparatus, this is not limited to the present embodiments and may be applied to various digital apparatuses, such as digital camcorders, personal digital assistants (PDAs), or smartphones.

FIG. 1 is a block diagram of an electronic apparatus 1 having a photographing function, according to an embodiment.

Referring to FIG. 1, the electronic apparatus 1 according to the current embodiment includes an interchangeable lens 100 and a body unit 200. The interchangeable lens 100 has a focus detection function, and the body unit 200 has a function of driving a zooming lens 102 and a focusing lens 105 by controlling the interchangeable lens 100.

The interchangeable lens 100 (hereinafter, referred to as a 'lens') includes an imaging optical system 101, a zooming lens driving actuator 103, a zooming lens position sensor 104, a focusing lens driving actuator 106, a focusing lens position sensor 107, an aperture driving actuator 109, a lens mount 110, a lens controller 111, and a lens manipulation unit 112.

The imaging optical system 101 includes the zooming lens 102 for zooming adjustment, the focusing lens 105 that changes a focal position, and an aperture 108. The zooming lens 102 and the focusing lens 105 may include lens groups including a plurality of combined lenses.

The zooming lens position sensor 104 and the focusing lens position sensor 107 detect a position of the zooming lens 102 and a position of the focusing lens 105, respectively. A timing of detecting the position of the focusing lens 105 may be set by the lens controller 111 or a controller 209 that will be described below. For example, a timing of detecting the position of the focusing lens 105 may be a timing of performing auto focus (AF) detection from an image signal.

The zooming lens driving actuator 103, the focusing lens driving actuator 106, and the aperture driving actuator 109 are controlled by the lens controller 111 and drive the zooming lens 102, the focusing lens 105, and the aperture 108, respectively. In particular, the focusing lens driving actuator 106 drives the focusing lens 105 in a direction of an optical axis.

The lens controller 111 controls the overall operation of each of the elements included in the lens 100. The lens controller 111 transmits the detected position information of the focusing lens 105 to the body unit 200. In this case, the lens controller 111 may transmit the detected position information of the focusing lens 105 to the body unit 200 when there is a change in the position of the focusing lens 105 or when there is a request for the position information of the focusing lens 105 from the controller 209.

The lens controller 111 may perform a power zooming operation, an AF operation, and a varifocal correction operation according to control from the body unit 200. That is, the lens controller 111 may be an example of a power zooming performing unit and a correction unit. However, the power zooming performing unit and the correction unit are not defined by only one lens controller 111, and a plurality of elements may be combined with each other and may perform a function of the power zooming performing unit and the correction unit.

Also, the lens controller 111 may include a storage unit in which data may be stored. Various information including lens data may be stored in the storage unit.

The lens mount 110 includes a lens side communication pin, engages with a camera side communication pin that will be described below, and is used as a transmission path for data or a control signal.

The lens manipulation unit 112 is a manipulation unit that allows power zooming manipulation or power focusing manipulation. The lens manipulation unit 112 is connected to the lens controller 111 and applies a manipulation signal caused by a user to the lens controller 111.

Next, the configuration of the body unit 200 will be described.

The body unit 200 may include a viewfinder 201, a shutter 203, an image sensor 204, an image sensor controller 205, a display unit 206, a manipulation button 207, the controller 209, an infrared detector 213, and a flash 211.

The viewfinder 201 may have a built-in liquid crystal display (LCD) unit 202 and may view a captured image in real-time.

The shutter 203 determines a time when light is radiated onto the image sensor 204, i.e., an exposure time.

The image sensor 204 captures an image of light that passes through the imaging optical system 101 of the lens 100 and generates an image signal. The image sensor 204 may include a plurality of photoelectric transformation units arranged in the form of a matrix and a vertical and/or horizontal transmission path on which charges are moved from the plurality of photoelectric transformation units and an image signal is read. A charge-coupled device (CCD) sensor or a complementary metal oxide semiconductor (CMOS) sensor may be used as the image sensor 204.

In detail, the image sensor 204 is a sensor that changes an optical signal into an electrical image signal. If light is radiated onto a light-receiving unit disposed within a unit pixel of an image sensor chip, the image sensor 204 detects light incident on each unit pixel and the amount of light, converts an optical signal into an electrical signal, and transmits the electrical signal to an analog and digital circuit unit for forming an image.

An image sensor according to the related art may be largely classified into CCD image sensor and a CMOS sensor according to a structure and an operating principle. The CMOS image sensor is generally called a CMOS image sensor (CIS).

The CCD image sensor transmits a signal electronic group generated due to light in each pixel to an output unit due to a pulse voltage applied to a gate, converts signals in the signal electronic group into voltages of the output unit, and sequentially transmits the voltages.

On the other hand, the CMOS image sensor converts signal electrons and holes generated due to light in each pixel into voltages inside each pixel. The voltages are connected to a signal processor, such as a decoder in each row and each column, and are transmitted to an outside of the pixel due to a switching operation according to a clock frequency.

One electron-hole pair (EHP) is generated in one photon incident from a light-receiving unit disposed in a unit pixel of the image sensor 204, and the generated electrons and holes are accumulated on a photodiode that is the light-receiving unit.

A maximum accumulation capacitance of the photodiode is proportional to a light-receiving area of the photodiode. In particular, since, in the CMOS image sensor, a region, in which accompanying transistors are disposed, is wider than that of the CCD image sensor, there is a physical limitation in increasing the area of the light-receiving unit. Also, the photodiode that is mainly used as a light-receiving unit of the image sensor has relatively small capacitance and thus is easily saturated, and it is difficult to subdivide signals in an analog manner.

Thus, a unit pixel of the CMOS image sensor requires a comparatively long optical charge-accumulated time so as to generate a minimum of charges for signal processing in a limited light-receiving region. Thus, it is not easy to manufacture the image sensor 204 having high density/high frame using unit pixels in which the light-receiving unit is disposed.

A band gap of a silicon semiconductor is 1.12 eV. When the silicon semiconductor is used as a light-receiving device, the silicon semiconductor may detect light energy having a wavelength band of 350 to 1150 nm. In this case, since light has different intrinsic energy according to wavelength and has different depths when the light transmits through silicon that is a solid material, the light has different photoelectric efficiency according to a wavelength band in the light-receiving device. The image sensor 204 is placed at a position of an interface of a PN junction so as to detect green having energy with a wavelength band of generally 550 nm to detect a wavelength band of 400 to 700 nm of a visible light region.

The image sensor controller 205 generates a timing signal and controls the image sensor 204 to capture an image in synchronization with the timing signal. Also, the image sensor controller 205 sequentially reads a horizontal image signal if charge accumulation in each scan line is completed. The read horizontal image signal is used in the controller 209 for AF detection.

Various images and information are displayed on the display unit 206. An organic light emitting display (OLED) device or an LCD device may be used as the display unit 206.

Various instructions from the user are input to the manipulation button 207 so as to manipulate the electronic apparatus 1. Examples of the manipulation button 207 include various buttons, such as a shutter release button, a main switch, a mode dial, and a menu button.

The controller 209 performs AF detection on the image signal generated by the image sensor 204 and calculates a contrast value. Also, the controller 209 stores the contrast value at each AF detection time according to the timing signal generated by the image sensor controller 205 and calculates a focal position using the lens position information transmitted from the lens 100 and the stored contrast value. A result of the calculation of the focal position is transmitted to the lens 100.

The controller 209 may instruct to drive the shutter 203 and the aperture 108 according to release signals to start a release operation of the electronic apparatus 1 from the manipulation button 207. That is, the controller 209 may be an example of a release controller. However, the release controller is not defined by only the controller 209, and a plurality of elements may be combined with each other and may perform a function of the release controller.

Also, according to an embodiment, the controller 209 may control the exposure time of the image sensor 204 based on the detection signal generated by the infrared detector 213.

Also, the controller 209 may control the exposure time of the image sensor 204 when main emission of the flash 211 is performed.

Also, the controller 209 may obtain a difference between a detection signal generated by the infrared detector 213 before emission of the flash 211 is performed and a detection signal generated by the infrared detector 213 while emission of the flash 211 is performed, as an increment in the detection signal.

Also, the controller 209 may determine a threshold value based on an appropriate amount of visible light, a correlation coefficient between an amount of visible light and an amount of infrared light, and the relationship between the amount of infrared light and the detection signal.

For example, the correlation coefficient between the amount of visible light and the amount of infrared light may mean the ratio of the amount of visible light to the amount of infrared light among light reflected from a subject.

For example, when an operation of adjusting a live view state or a focusing operation is performed, the controller 209 may check a color constitution ratio of the subject or objects within a viewing angle of the image sensor 204 of the electronic apparatus 1 and may create the correlation coefficient between the amount of visible light and the amount of infrared light using reflectivity of the visible light according to color.

According to an embodiment, the controller 209 may stop exposure of the image sensor 204 when the increment in the detection signal generated by the infrared detector 213, compared to the case in which the emission of the flash 211 is not performed, reaches the threshold value.

Also, the controller 209 may stop emission of the flash 211 when the increment in the detection signal generated by the infrared detector 213, compared to the case in which the emission of the flash 211 is not performed, reaches the threshold value.

Also, the controller 209 may control the shutter 203 to stop exposure of the image sensor 204 when the increment in the detection signal generated by the infrared detector 213, compared to the case in which the emission of the flash 211 is not performed, reaches the threshold value.

A camera mount 208 includes a camera side communication pin. Also, the camera mount 208 may supply power to the lens controller 111 through the camera mount 208.

Hereinafter, schematic operations of the lens 100 and the body unit 200 will be described.

When an image of the subject is captured, a main switch included in the manipulation button 207 is manipulated to start an operation of the electronic apparatus 1. The electronic apparatus 1 first performs live view display, as described below.

Light from the image of the subject that passes through the imaging optical system 101 is incident on the image sensor 204. In this case, the shutter 203 is in an open state. The incident light from the image of the subject is converted into an electrical signal by the image sensor 204, and thus an image signal is generated. The image sensor 204 operates according to the timing signal generated by the image sensor controller 205. The generated image signal of the subject is converted into displayable data by the controller 209 and is output to the view finder 201 and the display unit 206. This operation is live view display, and a live view image displayed by live view display is consecutively displayed as a moving image.

After live view display is performed, if a shutter release button as the manipulation button 207 is half pressed, the electronic apparatus 1 starts an AF operation. The AF operation is performed using the image signal generated by the image sensor 204. In a contrast AF method, the focal position is calculated from the contrast value, and the lens 100 is driven based on the calculated focal position. The contrast value is calculated by the controller 209. The controller 209 calculates information for controlling the focusing lens 105 from the contrast value and transmits the information to the lens controller 111 via the communication pins disposed on the lens mount 110 and the camera mount 208.

The lens controller 111 controls the focusing lens driving actuator 106 based on the received information, drives the focusing lens 105 in the direction of the optical axis, and performs the AF operation. The position of the focusing lens 105 is monitored by the focusing lens position sensor 107, and feedback control is performed.

When the zooming lens 102 is manipulated by the user and the zooming operation is performed, the position of the zooming lens 102 is detected by the zooming lens position sensor 104, and the lens controller 111 changes AF control parameters of the focusing lens 105, thereby performing AF again.

If the electronic apparatus 1 operates as described above and the image of the subject is focused, the shutter release button may be fully pressed, and the electronic apparatus 1 performs exposure. In this case, the controller 209 fully closes the shutter 203 and transmits photometry information that has been obtained until then, to the lens controller 111 as aperture control information. The lens controller 111 controls the aperture driving actuator 109 based on the aperture control information and narrows the aperture 108 using an appropriate aperture value. The controller 209 controls the shutter 203 based on the photometry information, opens the shutter 203 by an appropriate exposure time, and captures an image of the subject on which photographing has been performed.

The captured image is image signal processed and compressed and is stored in a memory card 212. Simultaneously, the captured image is output to the view finder 201 and the display unit 206 that display the subject. This image is referred to as a quick view image.

A series of photographing operations are completed using the above-described procedure.

The flash 211 may emit light including a visible light wavelength range and an infrared wavelength range and may radiate the light onto the subject.

A light source of the flash 211 may further include a general white light source including an infrared wavelength, a red light source halogen lamp, or an infrared light emitting diode (LED).

Also, at least a portion of far-sighted light emitted from at least one light source of the flash 211 may be converted into light having a relatively long wavelength by using a fluorescent material, thereby creating the flash 211. For example, the light source may be configured to generate light having a peak wavelength in a wavelength range of ultraviolet light and in a wavelength range of visible light. Also, the fluorescent material may include a combination of red, green, blue, and yellow phosphors.

The infrared detector 213 may absorb light in an infrared wavelength range.

According to an embodiment, the infrared detector 213 may include an organic layer that absorbs light in the infrared wavelength range.

The organic layer that is a general term of a layer formed of an organic polymer compound may be used for multi-purposes according to compounds. For example, AIkSQ or GIySQ that may absorb light in the infrared wavelength range may be used as the organic layer. The organic layer absorbs light in the infrared wavelength range so that the infrared detector 213 may block light in the infrared wavelength range.

According to an embodiment, the infrared detector 213 may absorb light in the infrared wavelength range and may generate a detection signal corresponding to the light.

For example, the infrared detector 213 may absorb light in the infrared wavelength range, may generate holes and charges, and may generate an electrical flow between electrodes. Thus, the infrared detector 213 may generate a detection signal corresponding to the electrical flow.

Also, the infrared detector 213 may be mounted on a front side of the image sensor 204. Thus, when reflective light of the flash 211 radiated onto the subject is incident on the lens 100, the infrared detector 213 may block light in the infrared wavelength range, and light in the visible light wavelength range may be formed on the image sensor 204. The image sensor 204 may photoelectrically transform incident light that is the formed light in the visible light wavelength range and may generate an image signal.

Figure 2:
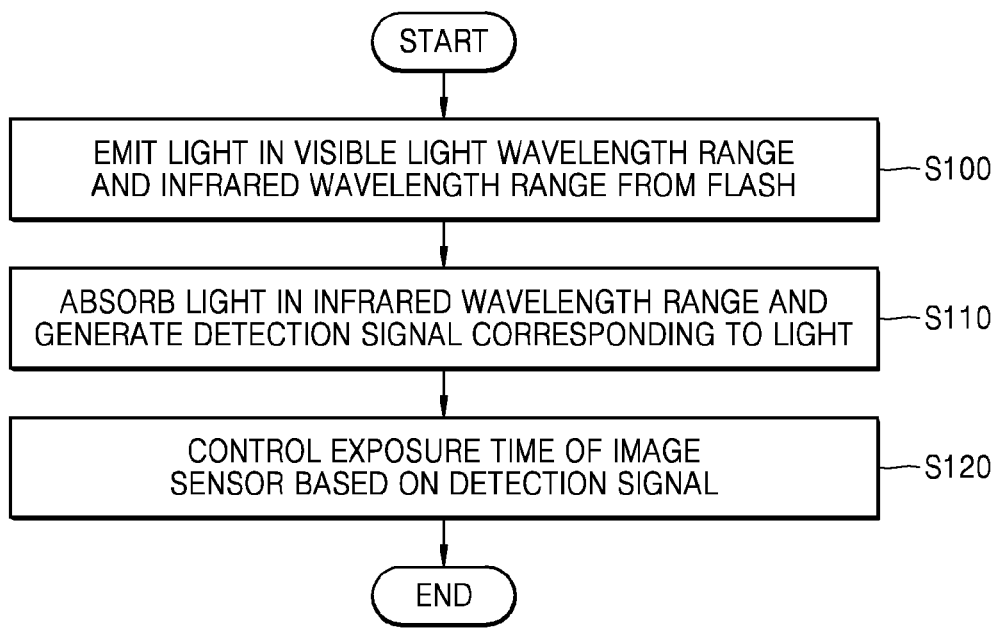
FIG. 2 is a flowchart of a method of controlling an exposure time, according to an embodiment.

FIG. 2 is a flowchart of a method of controlling an exposure time, according to an embodiment.

In Operation S100, the flash 211 emits light including the visible light wavelength range and the infrared wavelength range. A light source of the flash 211 may include a general white light source including an infrared wavelength, a red light source halogen lamp, or an infrared LED.

Also, at least a portion of far-sighted light emitted from at least one light source of the flash 211 may be converted into light having a relatively long wavelength by using a fluorescent material, thereby creating the flash 211. For example, the light source may be configured to generate light having a peak wavelength in a wavelength range of ultraviolet light and in a wavelength range of visible light. Also, the fluorescent material may include a combination of red, green, blue, and yellow phosphors.

In Operation S110, the infrared detector 213 absorbs light in the infrared wavelength range and generates a detection signal corresponding to the light.

According to an embodiment, the infrared detector 213 may include an organic layer that absorbs light in the infrared wavelength range.

For example, the infrared detector 213 may absorb the light in the infrared wavelength range, may generate holes and charges within the organic layer, and may generate an electrical flow between electrodes. Thus, the infrared detector 213 may generate a detection signal corresponding to the electrical flow.

In Operation S120, the controller 209 controls an exposure time of the image sensor 204 based on the detection signal.

When an increment in the generated detection signal reaches a threshold value, compared to the case in which the emission of the flash 211 is not performed, the exposure of the image sensor 204 may be stopped.

The threshold value may be set based on an appropriate amount of visible light, a correlation coefficient between an amount of visible light and an amount of infrared light, and the relationship between the amount of infrared light and the detection signal.

As an example in which the exposure of the image sensor 204 is stopped, the emission of the flash 211 may be stopped and the shutter 203 may be controlled to stop exposure of the image sensor 204.

Thus, when night photographing is performed and main emission is performed without pre-emission, the exposure time of the image sensor 204 is controlled using the infrared detector 213 so that a user's desired image may be captured while obtaining a sufficient amount of light without a temporal delay between pre-emission and main emission.

FIG. 3 is a flowchart of an operation of stopping emission of a flash when an increment in a generated detection signal reaches a threshold value, compared to a state in which the emission of the flash is not performed, according to an embodiment.

In operation S200, before the flash 211 emits light, light in the infrared wavelength range is absorbed, and a detection signal corresponding to the light is generated.

This is to compare the amount of light in the infrared wavelength range absorbed by the infrared detector 213 while main emission of the flash 211 is performed with the amount of light in the infrared wavelength range before main emission of the flash 211 is performed and consequentially, to measure the amount of light in the visible light wavelength range exposed by the image sensor 204.

In Operation S210, light including the visible light wavelength range and the infrared wavelength range is emitted from the flash 211. This is as described above in Operation S100 of FIG. 2.

In Operation S220, while the flash 211 emits light, light in the infrared wavelength range is absorbed and a detection signal corresponding to the light is generated. This is as described above in Operation S110 of FIG. 2.

In Operation S230, an increment in the detection signal is detected by calculating a difference between a detection signal generated before the flash 211 emits light and a detection signal generated while the flash 211 emits light.

The amount of light in the infrared wavelength range absorbed by the infrared detector 213 when main emission of the flash 211 is performed may be checked based on the increment in the detection signal.

In Operation S240, the increment in the detection signal is compared with a threshold value.

The threshold value may be set based on an appropriate amount of visible light, a correlation coefficient between an amount of visible light and an amount of infrared light, and the relationship between the amount of infrared light and the detection signal.

The increment in the detection signal and the threshold value are compared with each other so that an increment in the amount of light in the visible light wavelength range exposed by the image sensor 204 may be checked.

In Operation S240, if the increment in the detection signal is smaller than the threshold value, the method proceeds back to Operation S220, and light including the visible light wavelength range and the infrared wavelength range is continuously emitted from the flash 211.

If the increment in the detection signal is smaller than the threshold value, the image sensor 204 is not sufficiently exposed to an appropriate amount of light required for photographing, light including the visible light wavelength range and the infrared wavelength range is continuously emitted from the flash 211 so that an appropriate amount of light required for photographing may be satisfied.

In Operation S240, if the increment in the detection signal reaches the threshold value, in Operation S250, the emission of the flash 211 is stopped.

If the increment in the detection signal reaches the threshold value, since the image sensor 204 is sufficiently exposed to light required for photographing, the emission of the flash 211 is stopped.

Thus, when night photographing is performed and main emission is performed without pre-emission, the exposure time of the image sensor 204 is controlled using the infrared detector 213 so that a user's desired image may be captured while obtaining a sufficient amount of light without a temporal delay between pre-emission and main emission.

FIG. 4 is a flowchart of a method of controlling a shutter to stop exposure of an image sensor when the increment in the generated detection signal reaches the threshold value, compared to the state in which the emission of the flash is not performed, according to an embodiment.

In Operation S300, before the flash 211 emits light, light in the infrared wavelength range is absorbed and a detection signal corresponding to the light is generated. This is as described above in Operation S200 of FIG. 3.

In Operation S310, light including the visible light wavelength range and the infrared wavelength range is emitted from the flash 211. This is as described above in Operation S210 of FIG. 3.

In Operation S320, while the flash 211 emits light, light in the infrared wavelength range is absorbed and a detection signal corresponding to the light is generated. This is as described above in Operation S220 of FIG. 3.

In Operation S330, an increment in the detection signal is detected by calculating a difference between a detection signal generated before the flash 211 emits light and a detection signal generated while the flash 211 emits light. This is as described above in Operation S230 of FIG. 3.

In Operation S340, the increment in the detection signal is compared with a threshold value. This is as described above in Operation S240 of FIG. 3.

In Operation S340, if the increment in the detection signal is smaller than the threshold value, the method proceeds back to Operation S320 and light including the visible light wavelength range and the infrared wavelength range is continuously emitted from the flash 211. This is as described above in Operation S240 of FIG. 3.

In Operation S340, if the increment in the detection signal reaches the threshold value, in Operation S350, the shutter 203 is controlled to stop exposure of the image sensor 204.

If the increment in the detection signal reaches the threshold value, since the image sensor 204 is sufficiently exposed to light required for photographing, the shutter 203 is controlled to stop exposure of the image sensor 204.

According to an embodiment, when night photographing is performed and main emission is performed without pre-emission, the exposure time of the image sensor 204 is controlled using the infrared detector 213 so that a user's desired image may be captured while obtaining a sufficient amount of light without a temporal delay between pre-emission and main emission.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus having a photographing function, comprising:

a flash that emits light including a visible light wavelength range and an infrared wavelength range and radiates the light onto a subject;

an infrared detector that absorbs light in the infrared wavelength range and generates a detection signal corresponding to the light in the infrared wavelength range;

an image sensor that photoelectrically transforms incident light in the visible light wavelength range and generates an image signal; and a controller that controls an exposure time in which the image sensor is exposed to the incident light based on the detection signal, wherein, when an increment in the detection signal generated by the infrared detector, compared to a case in which the emission of the flash is not performed, reaches a threshold value, the controller stops exposure of the image sensor.

2. The electronic apparatus of claim 1, wherein the infrared detector is mounted on a front side of the image sensor.

3. The electronic apparatus of claim 1, wherein the infrared detector comprises an organic layer that absorbs light in the infrared wavelength range.

4. The electronic apparatus of claim 1, wherein the controller controls the exposure time of the image sensor when main emission of the flash is performed.

5. The electronic apparatus of claim 1, wherein the increment in the detection signal is a difference between a detection signal generated by the infrared detector before emission of the flash is performed and a detection signal generated by the infrared detector while the flash emits light.

6. The electronic apparatus of claim 1, wherein the threshold value is set based on an appropriate amount of visible light, a correlation coefficient between an amount of visible light and an amount of infrared light, and the relationship between the amount of infrared light and the detection signal.

7. The electronic apparatus of claim 1, wherein, when the increment in the detection signal generated by the infrared detector, compared to a case in which the emission of the flash is not performed, reaches the threshold value, the controller stops emission of the flash.

8. The electronic apparatus of claim 1, further comprising a shutter that controls exposure of the image sensor, wherein, when the increment in the detection signal generated by the infrared detector, compared to a case in which the emission of the flash is not performed, reaches the threshold value, the controller controls the shutter to stop exposure of the image sensor.

9. A method of controlling an exposure time by using infrared light, the method comprising:

emitting light including a visible light wavelength range and an infrared wavelength range from a flash;

absorbing light in the infrared wavelength range and generating a detection signal corresponding to the light in the infrared wavelength range; and controlling an exposure time in which an image sensor is exposed to an incident light in the visible light wavelength range based on the detection signal, wherein, if an increment in the detection signal, compared to a case in which the emission of the flash is not performed, reaches a threshold value, the exposure of the image sensor is stopped.

10. The method of claim 9, wherein, when main emission of the flash is performed, an exposure time of the image sensor is controlled.

11. The method of claim 9, wherein the increment in the detection signal is a difference between a detection signal generated before emission of the flash is performed and a detection signal generated while the flash emits light.

12. The method of claim 9, wherein the threshold value is set based on an appropriate amount of visible light, a correlation coefficient between an amount of visible light and an amount of infrared light, and the relationship between the amount of infrared light and the detection signal.

13. The method of claim 9, wherein, if the increment in the detection signal, compared to a case in which the emission of the flash is not performed, reaches a threshold value, the emission of the flash is stopped.

14. The method of claim 9, wherein, if the increment in the detection signal, compared to a case in which the emission of the flash is not performed, reaches a threshold value, a shutter is controlled to stop exposure of the image sensor.

15. A non-transitory computer-readable recording medium having recorded thereon computer program codes for performing a method of controlling an exposure time by using infrared light when the computer program codes are read and executed by a processor, the method of controlling an exposure time by using infrared light comprising:

emitting light including a visible light wavelength range and an infrared wavelength range from a flash;

absorbing light in the infrared wavelength range and generating a detection signal corresponding to the light in the infrared wavelength range; and controlling an exposure time in which an image sensor is exposed to an incident light in the visible light wavelength range based on the detection signal, wherein, when an increment in the detection signal, compared to a case in which the emission of the flash is not performed, reaches a threshold value, the emission of the flash is stopped.

16. The non-transitory computer-readable recording medium of claim 15, wherein, when main emission of the flash is performed, an exposure time of the image sensor is controlled.

17. The non-transitory computer-readable recording medium of claim 15, wherein, when the increment in the detection signal, compared to a case in which the emission of the flash is not performed, reaches a threshold value, a shutter is controlled to stop exposure of the image sensor.

* * * * *